No. 749,418. PATENTED JAN. 12, 1904.
E. G. ACHESON.
METHOD OF MAKING CARBON ARTICLES.
APPLICATION FILED SEPT. 4, 1902.
NO MODEL. 2 SHEETS—SHEET 1.

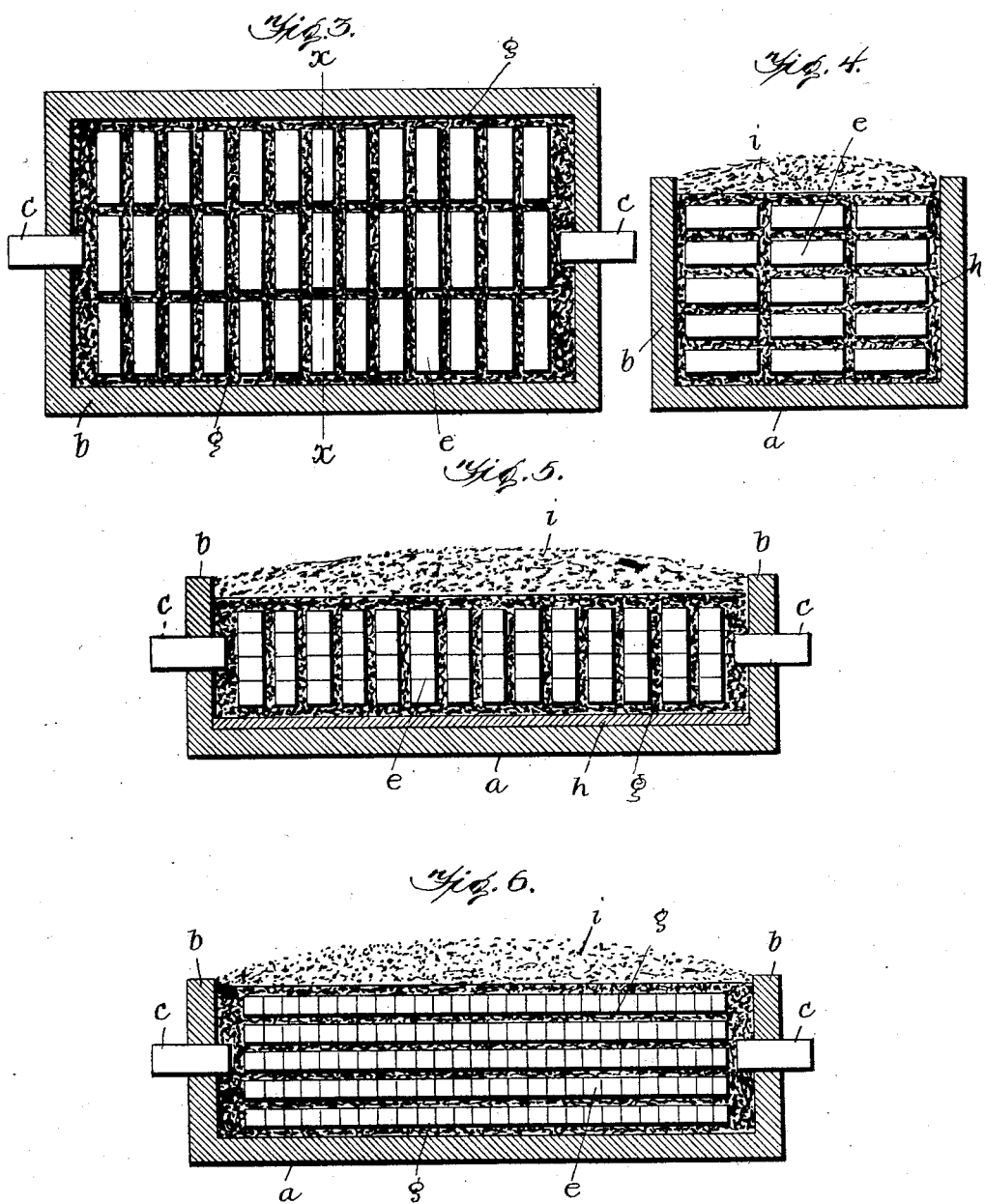

No. 749,418. Patented January 12, 1904.

UNITED STATES PATENT OFFICE.

EDWARD GOODRICH ACHESON, OF NIAGARA FALLS, NEW YORK.

METHOD OF MAKING CARBON ARTICLES.

SPECIFICATION forming part of Letters Patent No. 749,418, dated January 12, 1904.

Application filed September 4, 1902. Serial No. 122,117. (No specimens.)

*To all whom it may concern:*

Be it known that I, EDWARD GOODRICH ACHESON, a citizen of the United States, residing at Niagara Falls, in the county of Niagara and State of New York, have invented certain new and useful Improvements in Methods of Making Carbon Articles, of which the following is a specification.

My invention relates to a new method of manufacturing carbon articles; and the object of my invention is to so treat carbon articles that they shall be improved as to their physical characteristics, and more especially in relation to their density, conductivity, and resistance to chemical actions, while retaining their original form.

My invention provides a mode whereby carbon articles—such as electrodes, brushes, plates, and the like—made in accordance with the usual practice may be treated in large quantities subjected to the high temperatures by the use of electrical heat and be polymerized, so that they possess the physical characteristics desirable to a high degree, resulting in uniformity of action, greater endurance and efficiency of action, as well as cheapness.

The invention consists, broadly stated, in a method of heating carbon articles by embedding the said carbon articles in a suitable resistance material, converting electrical energy into heat energy within the mass of this resistance material, and conducting the heat energy thus produced into the bodies of the carbon articles in a direction approximately at right angles to their longest dimensions, thereby raising their temperatures in the most uniform manner attainable. Further details of my invention will be pointed out hereinafter.

In manufacturing carbon articles the customary method is to take some suitable carbon—such, for instance, as ordinary coke, coke produced by distillation of petroleum, or lampblack—which, being reduced to a suitable degree of subdivision, is mixed with tar or other appropriate binding material and molded under pressure into the desired forms, after which these forms are placed in a gas or coal heated furnace and slowly raised in temperature until all of the contained volatile hydrocarbons have been driven off, leaving the articles in a solid, dense, and coherent condition, in which condition they are used as electric-light points, electrodes, motor and generator brushes, battery-plates, &c. In the last step of this process as the articles under treatment are massed together in large volume much time is required for their efficient baking, and considerable difficulty is encountered in obtaining a uniform elevation of temperature throughout the several articles, and the failure to do so frequently results in serious warping or cracking of the goods being treated.

My invention provides for the application of electrical energy for the heating of the carbon articles in such manner as to produce a uniform elevation of temperature throughout the mass of the carbon article, thereby minimizing the evil effects pertaining to the old methods. It also provides for attaining temperatures much higher than those possible of attainment in the gas or coal heated type of furnace.

I discovered that carbon articles containing or associated with certain impurities after having been formed and baked in the manner described in the preceding paragraph would be improved for certain purposes for which they were intended by being transformed into graphite and have secured Letters Patent No. 617,979 for a method of accomplishing this result. I further secured Letters Patent No. 702,758, covering the process of treatment in the baking of said carbon articles for their conversion into graphite, which methods and processes are now being operated in an extensive manner in the manufacture of such goods.

In the two patents issued to me, above referred to, I confined myself to the treatment of carbon articles that either were originally suitable for conversion into graphite or that had been artificially so prepared, I having found it essential that carbon to be converted into graphite should contain or be associated with certain impurities with which the carbon reacted during the conversion into graphite.

I have recently discovered that carbon articles prepared by the old and prevailing methods of manufacture, whether capable of graphitization or not, when treated by the method covered by my present invention are made to acquire certain remarkable and valuable qualities that have already been recognized by several scientific investigators.

M. Berthelot made exhaustive researches on carbon under varying conditions, and he says: "Under the influence of heat alone—that is, calcining graphites and various amorphous carbons at a white heat in an atmosphere of hydrogen—I have never succeeded in passing from one group to the other. Only amorphous carbons appeared to experience an increase in cohesion."

Again, Henri Moissan did a great deal of original work on carbon, and in describing experments on lampblack, which had been very carefully purified by chemical means, he says: "Treated with the following mixture: sulfuric acid, 100 grams; pottassium bichromate, 16 grams, this lampblack was attacked at 60° centigrade. * * * The temperature of combustion in oxygen was taken by means of M. Le Chatelier's thermo-electric couple. It was 371° centigrade. Lampblack purified in this way allowed us to establish clearly the influence of temperature on the polymerization of this elementary substance. For that purpose we made the following experiments: First, the lampblack was calcined for five minutes in a small porcelain crucible by means of the blowpipe at 910° centigrade. After calcination it was no longer attacked by the chromium mixture till it reached a temperature of 90° and it took fire in oxygen at 440° centigrade."

I have found lampblack after having been made up into carbon articles in accordance with regular methods for the manufacture of carbon articles to have a density of 1.87, and after I had placed it in a furnace and subjected it to the high temperature produced by the electric current in accordance with my invention its density was 2.04, and it was found to be polymerized without substantial graphitization. Further, this same lampblack carbon after having been heated in this manner and used as an anode in an electrolytic bath in comparison with a similar carbon that had not been carried to the same degree of polymerization was much more difficult of disintegration, their relative values being, highly polymerized, 1.000, slightly polymerized, 1.571, the figures representing the weight of the loss per square centimeter of exposed surface.

Another illustration is to be found in carbon articles of suitable composition for conversion into graphite. These carbon articles, like the lampblack-carbon articles previously described, were part of a great quantity prepared for conversion into graphite and had been subjected to the highest temperatures used in the ordinary carbon-baking processes. They had a density of 2.00, and after having been subjected to a temperature in the electric furnace in accordance with my invention slightly under that necessary for the conversion into graphitic carbon the density was increased to 2.13. Carbon articles in every way similar to these when carried to the full temperature essential for their conversion into graphite have the density characteristic of graphite—viz., 2.20.

While I have given exact figures as to the density and rate of disintegration of the carbon articles in above examples, they were also in each case very materially improved in their electrical conductivity, increasing in electrical conductivity from one hundred to two hundred per cent. over that of carbon articles which have not been carried to the same degree of polymerization.

It will be seen from the foregoing results that carbon or carbon articles may be transformed into this peculiar state of polymerization without substantial graphitization and that the production of this state has a decided commercial value.

In the accompanying drawings there is indicated generally the character of furnace or furnaces suitable for the purposes.

Figure 1 is a plan view of an electrical furnace suitable for the practice of my invention. Fig. 2 is a vertical cross-section on the line V V of Fig. 1. Fig. 3 is a plan view of a similar electrical furnace, showing three vertical piles of carbon articles placed therein. Fig. 4 is a vertical cross-section on the lines X X of Fig. 3. Fig. 5 is a vertical longitudinal section of a furnace, showing a modification of the manner of packing the carbon articles. Fig. 6 is a similar view showing another modification.

While the form and arrangement of the furnace may vary without departing from the principles of my invention, those illustrated cover the forms now in use and show in a general way the relation between the carbon articles and the resistance material. Thus in Figs. 1 and 2 is shown a furnace whose general dimensions may vary through wide limits to meet the requirements of the current to be used and the carbon articles to be treated; but I have successfully used one of approximately the dimensions of thirty feet in length, thirty inches in width, and ten inches in depth, all inside measurements. The furnace consists of ordinary brick construction, $a$ representing the base, and $b\ b$ the walls. Inside of this brick structure is placed in some instances, but not always, a refractory lining $h$, consisting of carbid of silicon or other suitable refractory material.

$e\ e$ are the carbon articles it is desired to heat.

$g$ is granular carbon, a mixture of granular carbon and silica or other metallic oxid, metallic powder, or any other material in a suitable state of subdivision capable of carrying the necessary electric current and whose entire volume has a specific resistance greater than that of an equal volume composed of the carbon articles as determined at the completion of their treatment.

*c c* are the terminals of the furnace, by means of which connections are made to a suitable source of electrical energy.

*i* is a covering of a mixture of carbon and sand, earth, or other convenient material for protecting the contents of the furnace from atmospheric influences and for the purpose of reducing the heat radiation.

The mode of procedure in operating the furnace is as follows: The base, sides, and ends of the brick furnace having been arranged and where refractory lining *h* is used, this also having been placed with the terminals *c c* in proper position, a layer of the previously selected and prepared resistance material *g* is spread upon the floor of the furnace, and on this the carbon articles *e e* are arranged with their longest dimensions at approximately right angles to a line joining the furnace-terminals. The articles are properly spaced, allowing for a requisite amount of resistance material at the ends of the furnace for connection with the terminals and also for the necessary amount between each consecutive article in the direction of the furnace length. This space between the articles is varied with the dimensions of the articles to be treated, I having found that good results are obtained with this space representing twenty per cent. of the width of the carbon article. The layer of resistance material on the floor of the furnace having been covered with the carbon articles, arranged as described, an additional amount of the resistance material is spread over and between the carbon articles and brought to a proper level surface and another layer of carbon articles is put in place, as was done with the first layer, and this is repeated until the furnace has been filled to the desired depth, which will be largely governed by the desired cross-section, this in turn being adjusted to the temperature it is desired to attain and the electrical energy at disposal. The upper and last layer of carbon articles having been covered with the desired thickness of resistance material, the whole is covered with a layer of refractory and high-resistance material *i* to exclude the air from the contents of the furnace during the process of operation. The thickness of the horizontal layers or strata of the resistance material *g* between the several layers of carbon articles, as well as the thickness of the lower, upper, and side layers, are proportioned to suit the conditions of the particular carbon articles being treated. Thus if they are newly made and still contain the tar, pitch, or other binding material their resistance to the passage of the current is such that it will be necessary to carry practically all of the current at the beginning of the operation through the resistance material *g*, and the resistance material will therefore require to have sufficient cross-section to carry the desired amperage, whereas if the articles to be treated have already received a preliminary baking, and are thereby rendered conducting to a greater or less degree, it will increase the efficiency to reduce the cross-section of the resistance material *g*. The several articles act in this case as conducting-links for the passage of the current to the several vertical strata of resistance material *g*, separating the individual articles in the direction of the flow of the current.

Figs. 3 and 4 illustrate a furnace of a similar character, except that the carbon articles *e e* being short are arranged in three longitudinal lines or rows, with their longest dimensions at approximately right angles to the line joining the furnace-terminals, and these lines or rows are properly spaced and the spaces filled with the resistance material, as indicated.

Figure 1:
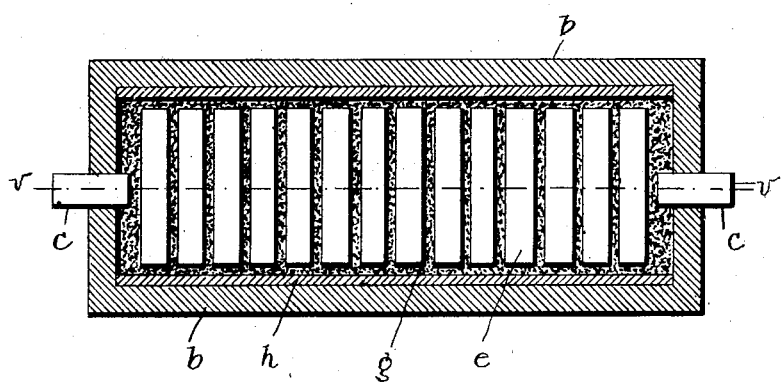
Figs. 1 and 2 illustrate a furnace made as heretofore described, in which the carbon articles *e e* are of a length to extend practically across the furnace, and they are shown as arranged in three longitudinal rows, each carbon article being individually embedded in the resistance material, with their longest dimensions at right angles to the line joining the furnace-terminals.
Figure 2:
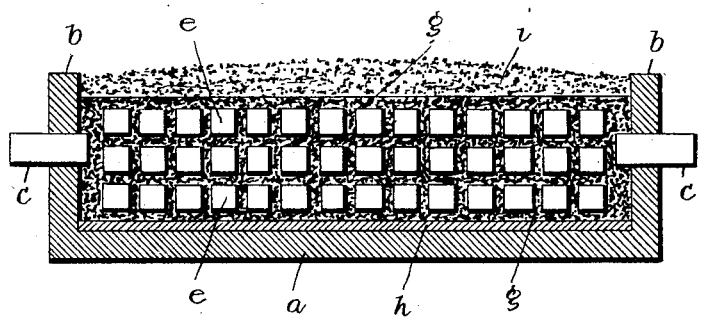

Fig. 5 illustrates the furnace in every way similar to that shown in Figs. 1 and 2, with the exception, however, of placing the superposed layers of carbon articles in immediate contact, thereby forming vertical piles without intervening resistance material. I find this method cheaper of construction and preferable to that shown in Figs. 1 and 2, where the articles to be treated have received a previous baking and are therefore electrical conductors.

Fig. 6 shows a modification wherein the vertical strata of resistance material between the several carbon articles is dispensed with, and the carbon articles are laid in contact in horizontal layers on the several horizontal strata of resistance material. This modification is particularly suitable for the heating of carbon articles that have not yet been freed from their volatile binding materials.

The furnace having been constructed as described and illustrated in Fig. 5 with carbon articles having a preliminary baking, its dimensions being as stated, with a length of thirty feet and a cross-section of thirty inches by ten inches within the walls of the furnace, I have obtained excellent results with a current having two hundred volts electromotive force and three thousand seven hundred and fifty amperes at the beginning of the operation, the volts gradually decreasing and the amperes increasing as the operation proceeded until at the close of the operation and after fifteen hours continuous run the volts were eighty-seven and the amperes eight thousand five hundred and eighty.

In carrying out the process the articles are placed in the furnace approximately at right angles to the direction of the flow of the current in order that the internal resistance of the furnace may be kept relatively high, and it will readily be understood that where the electrodes are placed in the furnace with their longest dimensions in the direction of the flow of the current they will owing to their relatively higher conductivity than the granular packing material more readily convey the current through the furnace than would be the case where they are placed at right angles, or approximately so, and a multitude of high-resistance spaces are presented in the path of the current. The real purpose and intention is not to produce heat in the carbon articles as the result of passing the current through the articles, but rather to produce the heat in the packing material separating the carbon articles, and this can best be accomplished by requiring the current to pass through this material where it intervenes between the successive carbon articles. Of course it will be understood that it would be possible, theoretically, to heat to the required degree a carbon article by passing a current lengthwise through its mass; but owing to the low resistance encountered it would be necessary to use relatively very low voltages of current and correspondingly high amperage, which renders it practically inoperative. In practical operation it is desirable and more economical, if not absolutely necessary, to use comparatively high voltage with a correspondingly low amperage and with these units produce the conversion into heat in relatively high resistances.

From the foregoing description it is evident that my invention is applicable to a great range of work. Thus newly-formed carbon articles may be heated for the purpose of driving off the volatile hydrocarbons, and the articles may then be removed from the furnace or they may be further heated to those temperatures essential for the attainment of a change in their physical characteristics as shown by increased density, increased conductivity, and increased resistance to chemical action that I have referred to as "polymerization," or the invention may be used in the heating of carbon articles that have previously been baked and freed from their volatile constituents for the purpose of further polymerization. When the invention is used for carrying the carbon articles through the complete range of temperature essential for the volatilization of the hydrocarbons and for a high degree of polymerization, the variation of temperature is so great that great flexibility in the electrical system is necessary, and I find it sometimes more convenient and economical to carry the articles through the first stages of the baking by placing them in two or more separate furnaces and connecting these in series, and after the first stages of the baking have been accomplished and greater amperage required I carry on the process to the higher temperatures by operating one of the furnaces at a time. By this arrangement I am able to complete the entire operation with an electrical unit of less range of adjustment and with greater economy.

In all instances in carrying out my invention or polymerizing the carbon articles the articles are embedded in a resistance material of the character indicated the specific resistance of the entire volume of which is greater than that of an equal volume of the completed or polymerized articles, an electric current is passed through the furnace and the electrical energy is converted into heat energy within the mass of the resistance material, and this heat is transmitted or conducted to the bodies of the embedded carbon articles in such a manner as to pass through the articles in a direction approximately at least at right angles to their longest dimensions, the articles acting as conducting-links to a greater or less extent for the passage of the current to the vertical strata of the resistance material.

I am aware that electrical energy has already been used for the purpose of carbonizing cellulose; but where this was practiced the very essential feature of my invention that requires the total volume of resistance material to have a higher specific resistance than a like volume of the carbon articles at the moment of the completion of the operation and when they have acquired their greatest conductivity is not complied with, and the method as practiced in the carbonizing of the cellulose is not applicable to the purposes of my invention. I am also aware that electrical energy has been used for baking articles made of carbon. Where this has been practiced it has either been the custom to connect the carbon in the electrical circuit and pass the electricity lengthwise through its body, the required heat being produced within the article as the result of the opposing resistance of its own mass to the passage of the current, or the electrical energy was caused to heat a core or mass of resistance material exterior to the carbon articles to be treated and the heat conducted from the core of the resistance material to the carbon article through an intervening layer or mass of insulating material, or as a modification the carbon articles were embedded in insulating material and arranged to abut against the core or resistance material with their longest dimensions at right angles thereto, and the heat generated in the resistance material was conducted into the carbon articles in the direction of their longest dimensions. Neither of these methods are productive of efficient or uniform results. Where the heat necessary for the operation is generated within the article itself, the operation must either be conducted on a very small scale or the electrical current must be of vast amperage, and difficulty is always met with in making suitable electrical connection with the articles to be treated. Where the heat is generated exterior to the article, as in the second instance, irregular results are produced during the process of elevating the temperature, and it is impossible to attain an even temperature throughout the length of the article at any time during the process, the resultant product being necessarily irregular and faulty.

In addition to the valuable features of this invention pertaining to the economical, uniform, and easily-controlled heating of carbon articles there is a valuable product produced in the resistance material when it consists of granular coke. In United States Patent No. 542,982 I described a process of purifying coke which consisted in granulating the coke and subjecting it to the required degree of temperature necessary to volatilize the impurities associated with it. It will be seen that when under my present invention those temperatures are reached necessary to produce a high degree of polymerization the coke also is polymerized, more or less of the impurities in it are driven off, and it is rendered more pure and made valuable as a material for making carbon articles requiring purity and conductivity.

Having thus described my invention, what I claim is—

1. The method substantially as hereinbefore described, of heating without substantially graphitizing carbon articles for the purposes set forth, which consists in embedding the carbon articles in suitable resistance material, converting electrical energy into heat energy within the mass of resistance material, and conducting sufficient of the heat energy thus produced into the bodies of the carbon articles to cause them to be polymerized.

2. The method substantially as hereinbefore described, of heating without substantially graphitizing carbon articles for the purposes set forth, which consists in embedding the carbon articles in suitable resistance material, the specific resistance of the entire volume of which is greater than that of an equal volume of the completed carbon articles, converting electrical energy into heat energy within the mass of resistance material, and conducting sufficient of the heat energy thus produced into the bodies of the carbon articles to cause them to be polymerized.

3. The method substantially as hereinbefore described, of heating without substantially graphitizing carbon articles for the purposes set forth, which consists in embedding the carbon articles in suitable resistance material, the specific resistance of the entire volume of which is greater than that of an equal volume of the completed carbon articles, converting electrical energy into heat energy within the mass of resistance material, and conducting sufficient of the heat energy thus produced into the bodies of the carbon articles, in a direction approximately at right angles to their longest dimensions to cause them to be polymerized.

4. The method substantially as hereinbefore described of polymerizing without substantially graphitizing carbon articles which consists in arranging the carbon articles with their longest dimensions in the same general direction in a mass of suitable resistance material, and passing a current of electricity through the mass in a direction approximately transverse to the direction of their longest dimensions.

5. The method substantially as hereinbefore described of polymerizing without substantially graphitizing carbon articles which consists in arranging the carbon articles with their longest dimensions in the same general direction in a mass of suitable resistance material, the specific resistance of the entire volume of which is greater than that of an equal volume of the polymerized carbon articles, and passing a current of electricity through the mass in a direction approximately transverse to the direction of their longest dimensions.

6. The method substantially as hereinbefore described of polymerizing without substantially graphitizing carbon articles which consists in arranging the carbon articles in separate piles with their longest dimensions in the same general direction in a mass of suitable resistance material, the specific resistance of the entire volume of which is greater than that of an equal volume of the polymerized carbon articles, and passing a current of electricity through the mass in a direction approximately transverse to the direction of their longest dimensions.

7. The method substantially as hereinbefore described of polymerizing carbon articles and purifying resisting materials which consists in arranging the carbon articles in piles separated by a mass of resisting material, and passing a current of electricity through the mass, sufficient to polymerize without substantially graphitizing the carbon articles and purifying the mass.

8. The method substantially as hereinbefore described of polymerizing carbon articles and purifying resisting materials which consists in arranging the carbon articles in piles separated by a mass of granular coke, and passing a current of electricity through the mass, sufficient to polymerize without substantially graphitizing the carbon articles and purifying the coke.

9. The method substantially as hereinbefore described of polymerizing carbon articles and purifying resisting materials which consists in embedding the carbon articles in a mass of resisting material, and passing a current of electricity through the mass, sufficient to polymerize without substantially graphitizing the carbon articles and purifying the mass.

In testimony whereof I have signed my name to this specification in the presence of two subscribing witnesses.

EDWARD GOODRICH ACHESON.

Witnesses:
FRANCIS ALEX. JAMES FITZGERALD,
HENRY MEECH LOOMIS.